United States Patent
Zhu et al.

(10) Patent No.: US 10,984,816 B2
(45) Date of Patent: Apr. 20, 2021

(54) VOICE ENHANCEMENT USING DEPTH IMAGE AND BEAMFORMING

(71) Applicant: GOERTEK INC., Weifang (CN)

(72) Inventors: Jian Zhu, Weifang (CN); Xiangdong Zhang, Weifang (CN); Zhenyu Yu, Weifang (CN); Zhiping Luo, Weifang (CN); Dong Yan, Weifang (CN)

(73) Assignee: GOERTEK INC., Shandong (CN)

( * ) Notice: Subject to any disclaimer, the term of this patent is extended or adjusted under 35 U.S.C. 154(b) by 87 days.

(21) Appl. No.: 16/475,013

(22) PCT Filed: Jul. 5, 2018

(86) PCT No.: PCT/CN2018/094658
§ 371 (c)(1),
(2) Date: Jun. 28, 2019

(87) PCT Pub. No.: WO2019/071989
PCT Pub. Date: Apr. 18, 2019

(65) Prior Publication Data
US 2019/0378530 A1    Dec. 12, 2019

(30) Foreign Application Priority Data
Oct. 13, 2017 (CN) .......................... 201710954593.9

(51) Int. Cl.
*G10L 21/028* (2013.01)
*G10L 15/30* (2013.01)
(Continued)

(52) U.S. Cl.
CPC ............ *G10L 21/028* (2013.01); *G10L 15/30* (2013.01); *G10L 17/02* (2013.01); *G10L 21/0216* (2013.01); *G10L 2021/02166* (2013.01)

(58) Field of Classification Search
CPC ............... G10L 21/028; G10L 21/0216; G10L 2021/02166; G10L 21/0208;
(Continued)

(56) References Cited

U.S. PATENT DOCUMENTS 8,570,378 B2 * 10/2013 Zalewski ................ G06T 7/248
348/169
9,530,426 B1 * 12/2016 Wright ................ G10L 21/0216
(Continued)

FOREIGN PATENT DOCUMENTS

CN    105045122 A    11/2015
CN    105058389 A    11/2015
(Continued)

OTHER PUBLICATIONS

China First Office Action corresponding to Chinese Application No. 201710954593.9, dated Feb. 6, 2020.
(Continued)

*Primary Examiner* — Jesse S Pullias
(74) *Attorney, Agent, or Firm* — Arent Fox LLP

(57) ABSTRACT

A voice enhancement method and apparatus of a smart device and a smart device are disclosed. The method comprises: monitoring and collecting a voice signal sent by a user in real time; determining a direction of the user according to the voice signal; collecting a depth image in the direction of the user; determining a sound source direction of the user according to the depth image; and adjusting a beamforming direction of a microphone array on the smart device according to the sound source direction of the user, and performing enhancement processing on the voice signal.

13 Claims, 4 Drawing Sheets

(51) Int. Cl.
*G10L 17/02* (2013.01)
*G10L 21/0216* (2013.01)

(58) Field of Classification Search
CPC ..... G10L 2015/223; G06T 2207/10028; G06T 7/40; G01S 5/0257; G01S 5/20
USPC ............... 704/200–257, 270–275, 500–504
See application file for complete search history.

(56) References Cited

U.S. PATENT DOCUMENTS

| | | | |
|---|---|---|---|
| 2014/0006026 A1* | 1/2014 | Lamb | G10L 17/00 704/246 |
| 2014/0362253 A1* | 12/2014 | Kim | G06T 7/70 348/231.4 |
| 2015/0281833 A1 | 10/2015 | Shigenaga et al. | |
| 2016/0379121 A1* | 12/2016 | Ge | G06K 9/00288 706/46 |
| 2017/0162213 A1* | 6/2017 | Anushiravani | G10L 25/48 |
| 2017/0186441 A1* | 6/2017 | Wenus | G01S 5/18 |
| 2017/0368688 A1 | 12/2017 | Lin et al. | |

FOREIGN PATENT DOCUMENTS

| | | |
|---|---|---|
| CN | 106024003 A | 10/2016 |
| CN | 106203259 A | 12/2016 |
| CN | 106251857 A | 12/2016 |
| CN | 107680593 A | 2/2018 |

OTHER PUBLICATIONS

International Search Report for PCT/CN2018/094658 dated Sep. 10, 2018 with English Translation.

* cited by examiner

VOICE ENHANCEMENT USING DEPTH IMAGE AND BEAMFORMING

CROSS REFERENCE TO RELATED APPLICATIONS

This application is a U.S. National Stage entry under 35 U.S.C. § 371 based on International Application No. PCT/CN2018/094658, filed on Jul. 5, 2018, which was published under PCT Article 21(2) and which claims priority to Chinese Patent Application No. 201710954593.9, filed on Oct. 13, 2017. The embodiment of the priority applications are hereby incorporated herein in their entirety by reference.

TECHNICAL FIELD

The present disclosure relates to the technical field of sound source localization, and more specifically to a voice enhancement method and apparatus of a smart device and a smart device.

BACKGROUND ART

As the acoustic environments in which smart devices such as robots are located become more and more complex, the speech recognition becomes more and more challenging for the intelligent hardware. When a user is far away from the microphone, the intelligent hardware may not recognize the voice signal inputted by the user. Therefore, it is necessary to perform voice enhancement processing on the inputted voice signal.

In conventional voice enhancement methods, when a user sends a voice signal, the sound source direction of the user is determined by sound source localization, and the intensity of the sound in the sound source direction of the user in the collected voice signal is increased by beamforming, while the signals in other directions in the collected voice signal will be filtered out as noise. Thus, the accuracy of the sound source direction of the user determined by the sound source localization is crucial to the speech enhancement effect. If the determined sound source direction of the user is inaccurate, the actual voice signal of the user will be filtered out as noise, and the voice command cannot be obtained and recognized.

In practical applications, when the user moves, the sound source direction of the user changes, so if the beamforming direction in the voice enhancement algorithm remains unchanged, the actual voice signal of the user may be filtered out as external noise, and the voice command in the user's voice signal cannot be obtained and recognized. At this point, in order to correctly recognize the voice command in the voice signal, the user must re-input a voice signal (voice keyword) for controlling the activation of sound source localization function, re-perform sound source localization to determine the sound source direction of the user, and perform voice enhancement by using the newly determined sound source direction. When the user is continuously moving, if he/she wants to control the smart device such as a robot by voice, he/she must say the voice keyword for controlling the activation of sound source localization function repeatedly, to re-locate the sound source direction of the user, which reduces the user experience.

SUMMARY

In order to solve the problem of the conventional voice enhancement method that voice commands cannot be recognized and obtained because the determined sound source direction of the user is inaccurate, the present disclosure provides a voice enhancement method and apparatus and a smart device.

An embodiment of the present disclosure provides a voice enhancement method of a smart device, comprising:
monitoring and collecting a voice signal sent by a user in real time;
determining a direction of the user according to the voice signal;
collecting a depth image in the direction of the user;
determining a sound source direction of the user according to the depth image; and
adjusting a beamforming direction of a microphone array on the smart device according to the sound source direction of the user, and performing enhancement processing on the voice signal.

Another embodiment of the present disclosure provides a voice enhancement apparatus of a smart device, comprising:
a voice signal collecting unit for monitoring and collecting a voice signal sent by a user in real time;
a user direction determining unit for determining a direction of the user according to the voice signal;
a depth image collecting unit for collecting a depth image in the direction of the user;
a sound source direction determining unit for determining a sound source direction of the user according to the depth image; and
an enhancement processing unit for adjusting a beamforming direction of a microphone array on the smart device according to the sound source direction of the user, and performing enhancement processing on the voice signal.

Still another embodiment of the present disclosure provides a smart device, comprising a memory and a processor which are communicatively connected by an internal bus, wherein the smart device further comprises a microphone array and a depth camera that are connected to the processor respectively;
the microphone array monitors and collects in real time a voice signal sent by a user, and sends the voice signal to the processor;
the depth camera collects a depth image in the direction of the user, and sends the depth image to the processor; and
the memory stores a program instructions executable by the processor, and when executed by the processor, the program instructions is able to implement the voice enhancement method of a smart device as described above.

The advantageous effects of the present disclosure are as follows. Firstly the direction of the user is roughly determined according to the obtained voice signal sent by the user of the smart device; and after obtaining the approximate direction of the user, a depth image in the direction of the user is further collected, and then the sound source direction of the user is accurately determined according to the depth image. The sound source direction of the user determined according to the depth image is used as a reference for adjusting the beamforming direction of the microphone array, and the quality and intensity of the sound in the sound source direction of the user is improved.

Compared with the prior art, the present disclosure determines the sound source direction of the user more accurately by using the depth image, and thus determines the beamforming direction of the microphone array more accurately. Therefore, the microphone array can accurately face the sound source direction of the user and perform voice enhancement, the defect of the prior art that voice commands cannot be recognized and obtained because the determined sound source direction of the user is inaccurate and the actual voice signal sent by the user may be misjudged and filtered out as noise in the voice enhancement processing can be overcome, the effect and accuracy of voice enhancement can be improved, and thus the accuracy of voice command recognition can be improved.

DETAILED DESCRIPTION

In order to solve or partially solve the technical problems discussed in the background art, the inventors of the present disclosure come up with the following idea. Namely, the direction of the user is roughly determined according to the obtained voice signal sent by the user, collecting a depth image in the direction of the user, and determining a sound source direction of the user according to the depth image. The sound source direction of the user determined according to the depth image is used as a reference for adjusting the beamforming direction of the microphone array, to increase the intensity of the sound in the sound source direction of the user. Compared with the prior art, the present disclosure determines the sound source direction of the user more accurately by using the depth image, and thus determines the beamforming direction of the microphone array more accurately. Therefore, the defect of the prior art that voice commands cannot be recognized and obtained because the determined sound source direction of the user is inaccurate can be overcome, the effect of voice enhancement can be improved, and the voice command can be recognized and obtained.

In order to make the objectives, technical solutions and advantages of the present disclosure clearer, the embodiments of the present disclosure will be further described in detail below with reference to the accompanying drawings.

Figure 1:
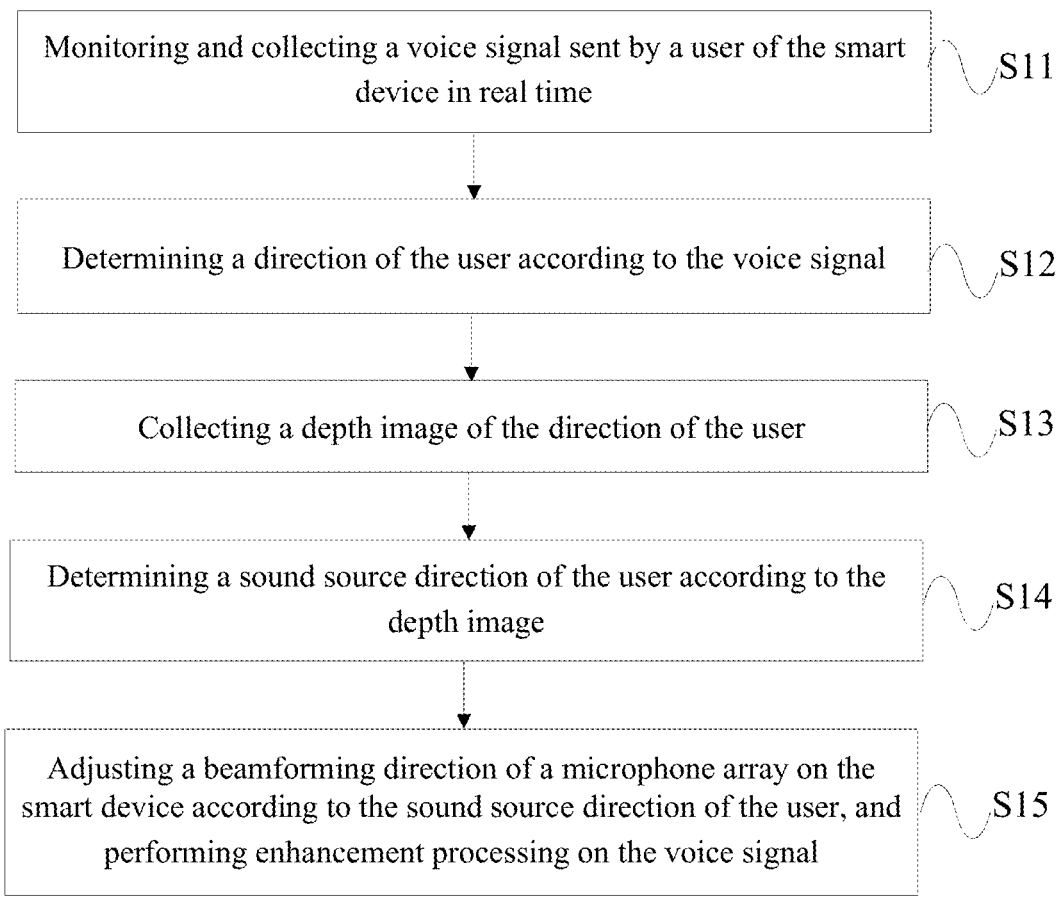
FIG. 1 is a schematic flow diagram of a voice enhancement method of a smart device according to an embodiment of the present disclosure.

FIG. 1 is a schematic flow diagram of a voice enhancement method of a smart device according to an embodiment of the present disclosure. As shown in FIG. 1, the method of the present embodiment comprises:

S11: monitoring and collecting a voice signal sent by a user of the smart device in real time.

Figure 2:
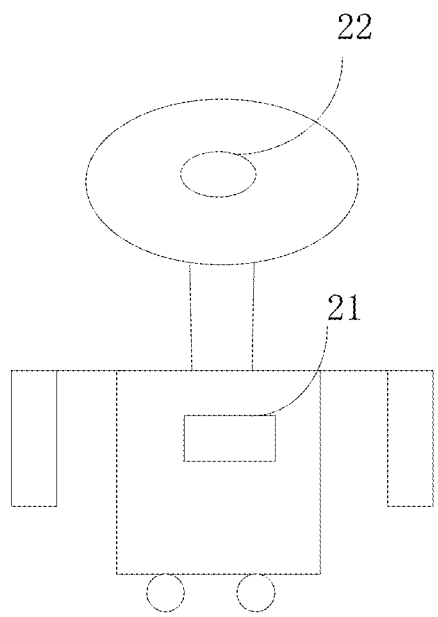
FIG. 2 is a schematic structural diagram of a smart device according to an embodiment of the present disclosure.

In a specific implementation, the voice signal sent by the user may be collected by a voice collector. In the present embodiment, the voice collector is preferably a microphone array. As shown in FIG. 2, the microphone array 21 is arranged on a side surface of the smart device. It should be understood that, the arrangement of the microphone array 21 shown in FIG. 2 is only schematic. When the smart device is a robot, the microphone array may also be arranged at the head or other sites of the robot.

S12: determining a direction of the user according to the voice signal.

It should be understood that, in the present embodiment, the smart device determines the direction of the user according to the voice signal by sound source localization. Here, the direction of the user is the current general direction of the user.

S13: collecting a depth image in the direction of the user.

After determining the general direction of the user, in the present embodiment, a depth image in the direction of the user is collected by using a depth camera. As shown in FIG. 2, a depth camera 22 is arranged on a side surface of the smart device. It should be understood that, the arrangement of the depth camera 22 shown in FIG. 2 is only schematic. When the smart device is a robot, the depth camera may also be arranged at other sites of the robot.

S14: determining a sound source direction of the user according to the depth image.

The depth image refers to an image in which the distances (depths) from the depth camera to each of the points in the scene serve as the pixel values. The method may determine the spatial position coordinate of the sound source of the user according to the depth image, and determine the sound source direction of the user according to the spatial position coordinate of the sound source of the user.

S15: adjusting a beamforming direction of a microphone array on the smart device according to the sound source direction of the user, and performing enhancement processing on the voice signal.

It should be understood that, the performing enhancement processing on the voice signal refers to increasing the intensity of the voice signal in the beamforming direction and filtering out the voice signals in other directions. If the direction of the user determined according to the voice signal is used as the beamforming direction for voice enhancement, when the direction of the user determined is inaccurate, the actual voice signal of the user may be filtered out as external noise, and the voice command of the user cannot be recognized. In the present embodiment, the voice enhancement is performed by using the sound source direction of the user determined from the depth image as the beamforming direction of the microphone array.

According to the voice enhancement method of a smart device in the present embodiment, firstly the direction of the user is roughly determined according to the obtained voice signal sent by the user of the smart device; and after obtaining the approximate direction of the user, a depth image in the direction of the user is further collected, and then the sound source direction of the user is accurately determined according to the depth image. The sound source direction of the user determined according to the depth image is used as a reference for adjusting the beamforming direction of the microphone array, and the quality and intensity of the sound in the sound source direction of the user is improved.

Compared with the prior art, the present disclosure determines the sound source direction of the user more accurately by using the depth image, and thus determines the beamforming direction of the microphone array more accurately. Therefore, the microphone array can accurately face the sound source direction of the user and perform voice enhancement, the defect of the prior art that voice commands cannot be recognized and obtained because the determined sound source direction of the user is inaccurate and the actual voice signal sent by the user may be misjudged and filtered out as noise in the voice enhancement processing can be overcome, the effect and accuracy of voice enhancement can be improved, and thus the accuracy of voice command recognition can be improved.

In practical applications, the user may move, and when the user moves, the sound source direction changes. If the depth image is not re-collected with respect to the moved user and the enhancement processing on the voice signal is performed still according to the sound source direction determined from the depth image before the moving of the user, the actual voice signal of the user will be filtered out as noise, and voice commands cannot be recognized and obtained. Thus, the user needs to repeat the keyword which can activate the sound source localization function of the microphone array, and the microphone array re-localizes the sound source, which affects the user experience.

In an alternative embodiment of the present disclosure, the method is similar to the method shown in FIG. 1, and further comprises:
    monitoring the user's movement in real time;
    collecting a moving direction of the user when it is monitored that the user is moving; and
    controlling the smart device to move toward the moving direction of the user, and collecting a depth image after the user moves.

In the present embodiment, a depth camera may be arranged on the smart device, and the movement state of the user is monitored in real time according to the depth image in the user collected by the depth camera. When it is monitored that the user is moving, the moving direction of the user is collected, and the smart device is controlled to move toward the moving direction of the user. Thus, when the user moves in a certain direction, the smart device also rotates in the certain direction. The smart device re-collects the depth image in the user after the movement, and determines the sound source direction of the user according to the re-collected depth image in the user. Therefore, the user's actual voice signal will not be filtered out as external noise, the user command can still be recognized and obtained when the user moves, and the user does not need to repeat the keyword, thereby improving the user experience.

Specifically, the step of determining a sound source direction of the user according to the depth image comprises:
    determining a spatial position coordinate of a preset part of the user according to the depth image; and
    determining the sound source direction of the user according to a spatial position coordinate of the microphone array and the spatial position coordinate of the preset part of the user.

It should be understood that, the depth image contains depth information, and the method can accurately determine a spatial position coordinate of a preset part of the user according to the depth image containing the depth information by using a skeletal algorithm, and in turn determine the sound source direction of the user according to the spatial position coordinate of the microphone array and the spatial position coordinate of the preset part of the user. Preferably, the preset part of the user is the head or neck.

Figure 3:
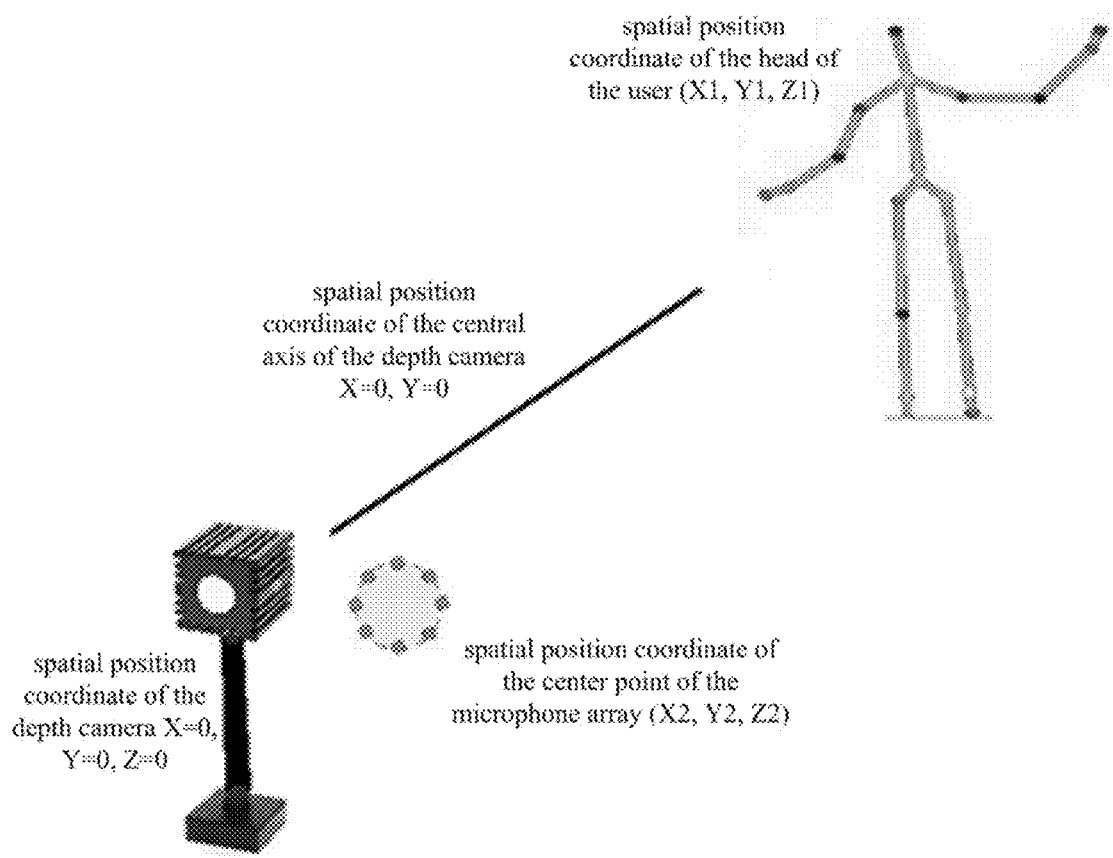
FIG. 3 is a schematic diagram showing the relationship of the spatial position coordinates of a depth camera, a microphone array and a user according to an embodiment of the present disclosure.

In an embodiment of the present disclosure, a spatial position coordinate system is established with the depth camera as the origin, wherein the direction perpendicular to the ground and pointing upwardly is the positive direction of the Y-axis; the X-axis and the Z-axis are parallel to the ground; the Z-axis coincides with the center axis of the depth camera; the direction in which the depth camera collects the depth image is the positive direction of the Z-axis; and the X-axis is perpendicular to the Z-axis. As shown in FIG. 3, the spatial position coordinate of the center point of the depth camera is taken as the coordinate origin (0, 0, 0), and all of the points on the central axis satisfy X=0, Y=0. In the spatial position coordinate system, the direction that passes through the center point of the microphone array and is parallel to the X-axis is taken as the reference 0 degree direction. The specific process of, according to the spatial position coordinate of the microphone array and the spatial position coordinate of the head of the user, determining the sound source direction of the user, and determining a distance between the smart device and the user will be described below with reference to FIG. 4.

Figure 4:
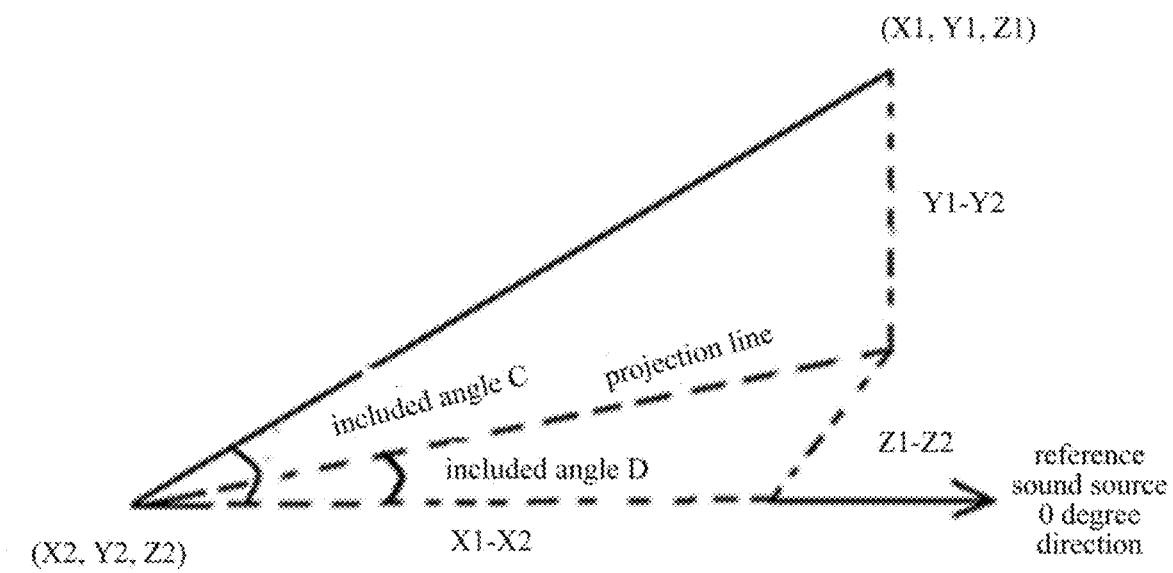
FIG. 4 is a schematic diagram showing the relationship of the spatial position coordinates of the preset part of the user and the microphone array according to an embodiment of the present disclosure.

Assuming that in the depth image in the user collected by the depth camera, the extracted spatial position coordinate of the head of the user is (X1, Y1, Z1) and the spatial position coordinate of the center point of the microphone array is (X2, Y2, Z2), wherein the spatial position coordinate of the center point of the microphone array may be obtained according to the positional relationship between the microphone array and the depth camera and is a fixed value, referring to FIG. 4, the included angle between the X-axis and the line connecting the center point of the microphone array and the head of the user may be calculated according to the following formula:

$$C = \arctan\left(\frac{\sqrt{(Y1-Y2)^2 + (Z1-Z2)^2}}{X1-X2}\right),$$

the included angle between the X-axis and the projection line of the line connecting the center point of the microphone array and the head of the user in the horizontal plane may be calculated according to the following formula:

$$D = \arctan\left(\frac{Z1-Z2}{X1-X2}\right),$$

and
    the linear distance between the center point of the microphone array and the head of the user is:

$$L = \sqrt{(X1-X2)^2 - (Y1-Y2)^2 + (Z1-Z2)^2}.$$

Since the microphone array is arranged on the smart device, the above linear distance L may be approximated as a linear distance between the smart device and the head of the user.

Therefore, the distance between the smart device and the user can be determined by the included angle C, the included angle D and the distance L, and the sound source direction of the user can be accurately positioned.

In practical applications, when the user moves, the distance between the smart device and the user may exceed the sound pickup range of the microphone array, and at this time the user command cannot be recognized.

Further, in order to ensure that the distance between the smart device and the user is within the sound pickup range, the method further comprises:

determining a distance between the smart device and the user according to the depth image in the direction of the user;

determining whether to control the smart device to move according to the distance between the smart device and the user; and if yes, controlling the smart device to move toward the direction of the user to shorten the distance between the smart device and the user.

In practical applications, the method may control the smart device to move toward the direction of the user in a preset step length, and acquire the distance after the movement in real time. Alternatively, the method may calculate the difference between the sound pickup range and the distance between the smart device and the user, and control the smart device to move toward the direction of the user by a specified distance according to the difference, so that the distance between the smart device and the user is within the sound pickup range.

Specifically, the step of determining a distance between the smart device and the user according to the depth image in the direction of the user comprises:

determining a spatial position coordinate of a preset part of the user according to the depth image in the direction of the user; and determining a distance between the smart device and the preset part of the user according to the spatial position coordinate of the microphone array and the spatial position coordinate of the preset part of the user.

It should be understood that, in the present embodiment, the distance between the smart device and a preset part of the user refers to the linear distance.

Specifically, the step of determining whether to control the smart device to move according to the distance between the smart device and the user comprises:

if a distance between the smart device and a preset part of the user is greater than a preset distance threshold, controlling the smart device to move.

It should be noted that, in the present disclosure, when the distance between the smart device and the preset part of the user is greater than the preset distance threshold, the smart device is controlled to move to shorten the distance between the smart device and the user, so that it is ensured that the distance between the smart device and the user is within the sound pickup range to complete the voice command recognition.

In practical applications, the controlling the smart device to move comprises controlling the smart device to move and to rotate. Assuming that the sound pickup range of the microphone array, i.e., the preset distance threshold is S, if L is greater than S, that indicates that the distance between the smart device and the preset part of the user is greater than the preset distance threshold; that is, the distance between the smart device and the user is beyond the sound pickup range. It is necessary at this time to control the smart device to move by the distance of L-S to shorten the distance between the smart device and the user.

In order to control the rotation of the smart device, the horizontal rotation direction of the smart device may be determined according to the spatial position coordinate of the microphone array and the spatial position coordinate of the preset part of the user.

Referring to FIG. 4, the included angle between the X-axis and the projection line of the line connecting the center point of the microphone array of the smart device and the head of the user is determined according to the following formula:

$$D = \arctan\left(\frac{Z1 - Z2}{X1 - X2}\right),$$

wherein D is the included angle between the X-axis and the projection line of the line connecting the center point of the microphone array and the head of the user in the horizontal plane, that is, the horizontal rotation direction of the smart device. By controlling the smart device to horizontally rotate to the direction D, the user can enter the sound pickup range of the microphone array.

It should be noted that since the direction of the center point of the microphone array along the X-axis is the reference 0 degree direction, the sound source direction of the user is determined by the included angle C between the X-axis and the line connecting the center point of the microphone array and the head of the user, and the included angle D between the X-axis and the projection line of the line connecting the center point of the microphone array and the head of the user in the horizontal plane.

In practical applications, when the distance between the smart device and the preset part of the user is greater than the preset distance threshold, the smart device is controlled to rotate to the direction D in the horizontal direction and move by the distance of L-S, and then re-collect the depth image in the direction of the user, and the sound source direction of the user is determined according to the re-collected depth image.

Figure 5:
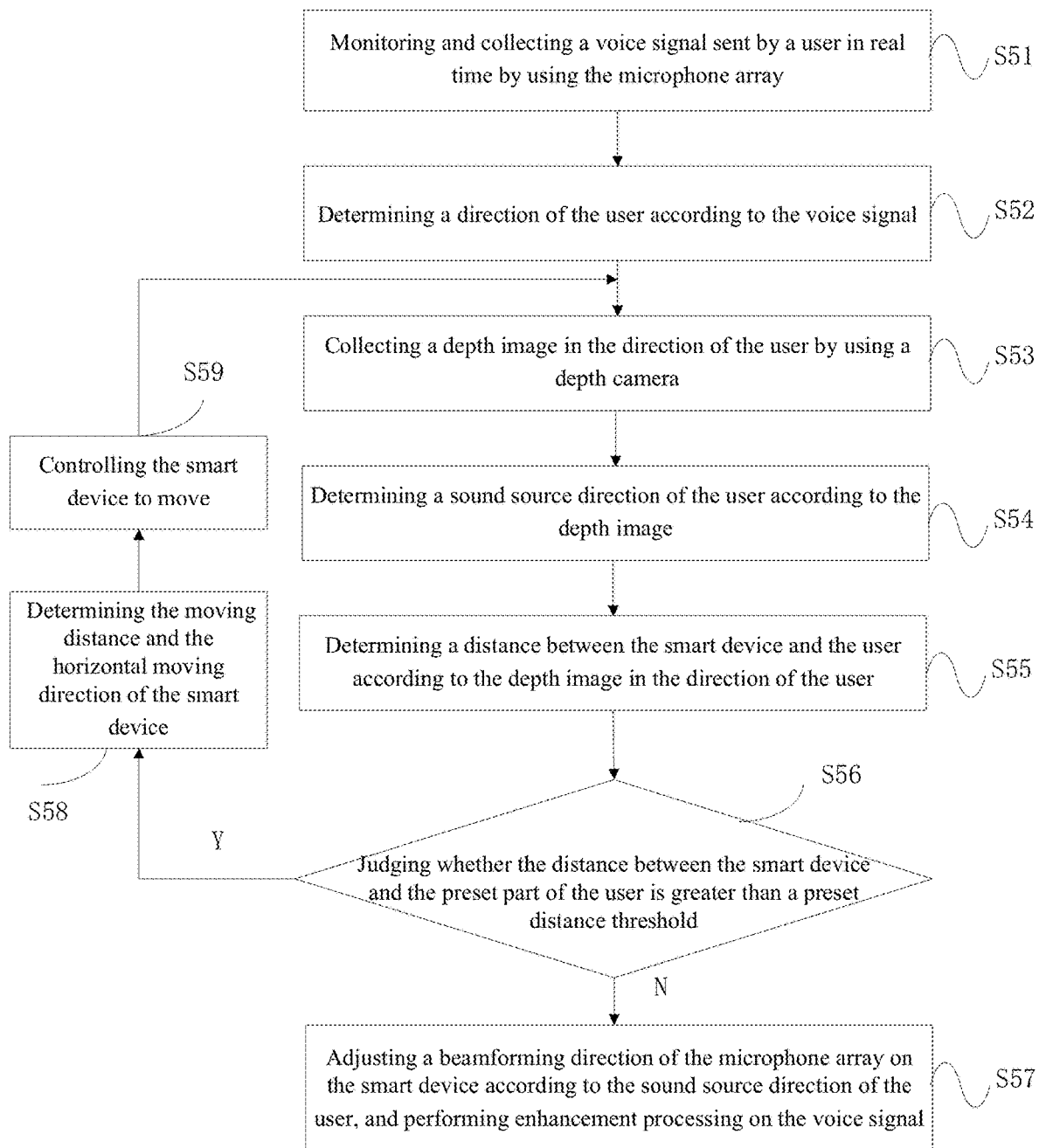
FIG. 5 is a schematic flow diagram of a voice enhancement method of a smart device according to another embodiment of the present disclosure.

The complete process for ensuring that the distance between the smart device and the user is within the sound pickup range and realizing the voice enhancement in the present disclosure is described as follows by referring to FIG. 5. As shown in FIG. 5, the method of the present embodiment comprises:

S51: monitoring and collecting a voice signal sent by a user in real time by using the microphone array;

S52: determining a direction of the user according to the voice signal;

S53: collecting a depth image in the direction of the user by using a depth camera;

S54: determining a sound source direction of the user according to the depth image;

S55: determining a distance between the smart device and the user according to the depth image in the direction of the user;

S56: judging whether the distance between the smart device and the preset part of the user is greater than a preset distance threshold, and if yes, proceeding to step S58, otherwise, proceeding to step S57;

S57: adjusting a beamforming direction of the microphone array on the smart device according to the sound source direction of the user, and performing enhancement processing on the voice signal;

S58: determining the moving distance and the horizontal moving direction of the smart device; and S59: controlling the smart device to move to shorten the distance between the smart device and the user, and returning to step S53 to re-collect the depth image in the user.

In the present embodiment, firstly the direction of the user is roughly determined according to the obtained voice signal sent by the user of the smart device; and after obtaining the approximate direction of the user, a depth image in the direction of the user is further collected, and then the sound source direction of the user is accurately determined according to the depth image. The sound source direction of the user determined according to the depth image is used as a reference for adjusting the beamforming direction of the microphone array, and the quality and intensity of the sound in the sound source direction of the user is improved.

Compared with the prior art, the present disclosure determines the sound source direction of the user more accurately by using the depth image, and thus determines the beamforming direction of the microphone array more accurately. Therefore, the microphone array can accurately face the sound source direction of the user and perform voice enhancement, the defect of the prior art that voice commands cannot be recognized and obtained because the determined sound source direction of the user is inaccurate and the actual voice signal sent by the user may be misjudged and filtered out as noise in the voice enhancement processing can be overcome, the effect of voice enhancement can be improved, and the voice command can be recognized and obtained.

Moreover, in the present embodiment, when the distance between the smart device and the preset part of the user is greater than the preset distance threshold, the moving distance and the horizontal moving direction are sent to the smart device, and the smart device is controlled to move to shorten the distance between the smart device and the user, so that it is ensured that the distance between the smart device and the user is within the sound pickup range to complete the voice command recognition.

Figure 6:
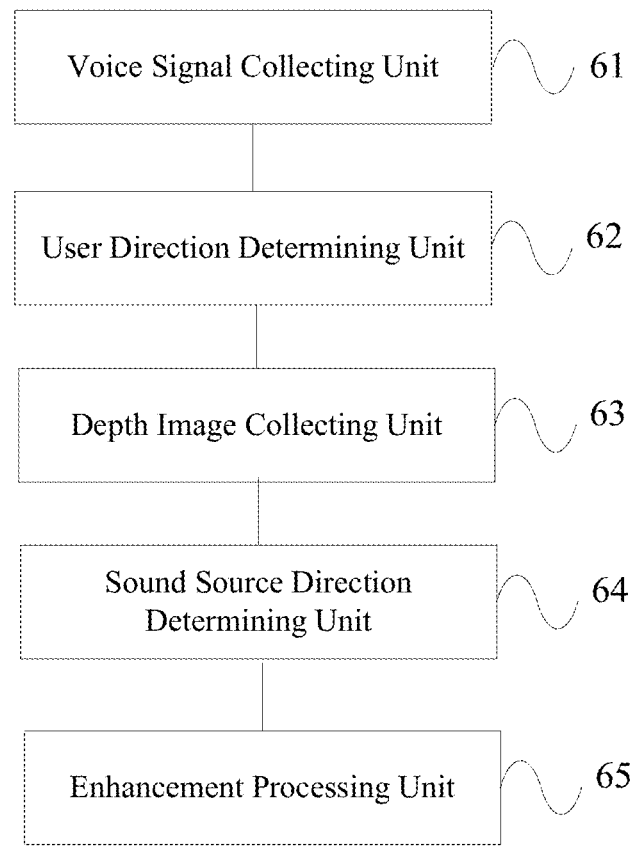
FIG. 6 is a schematic structural diagram of a voice enhancement apparatus of a smart device according to an embodiment of the present disclosure.

FIG. 6 is a schematic structural diagram of a voice enhancement apparatus of a smart device according to an embodiment of the present disclosure. As shown in FIG. 6, the apparatus of the present embodiment comprises: a voice signal collecting unit 61, a user direction determining unit 62, a depth image collecting unit 63, a sound source direction determining unit 64, and an enhancement processing unit 65. Specifically, the voice signal collecting unit 61 is for monitoring and collecting a voice signal sent by a user in real time;

the user direction determining unit 62 is for determining a direction of the user according to the voice signal;

the depth image collecting unit 63 is for collecting a depth image in the direction of the user;

the sound source direction determining unit 64 is for determining a sound source direction of the user according to the depth image; and the enhancement processing unit 65 is for adjusting a beamforming direction of a microphone array on the smart device according to the sound source direction of the user, and performing enhancement processing on the voice signal.

According to the voice enhancement apparatus of a smart device in the present embodiment, firstly the direction of the user is roughly determined according to the obtained voice signal sent by the user of the smart device; and after obtaining the approximate direction of the user, a depth image in the direction of the user is further collected, and then the sound source direction of the user is accurately determined according to the depth image. The sound source direction of the user determined according to the depth image is used as a reference for adjusting the beamforming direction of the microphone array, and the quality and intensity of the sound in the sound source direction of the user is improved.

Compared with the prior art, the present disclosure determines the sound source direction of the user more accurately by using the depth image, and thus determines the beamforming direction of the microphone array more accurately. Therefore, the microphone array can accurately face the sound source direction of the user and perform voice enhancement, the defect of the prior art that voice commands cannot be recognized and obtained because the determined sound source direction of the user is inaccurate and the actual voice signal sent by the user may be misjudged and filtered out as noise in the voice enhancement processing can be overcome, the effect of voice enhancement can be improved, and the voice command can be recognized and obtained.

In an alternative embodiment of the present disclosure, the apparatus further comprises:

a movement monitoring unit for monitoring the user's movement in real time;

a moving direction collecting unit for collecting a moving direction of the user when it is monitored that the user is moving;

a movement controlling unit for controlling the smart device to move toward the moving direction of the user; and the depth image collecting unit is further for collecting a depth image after the user moves.

The sound source direction determining unit 64 is particularly for:

determining a spatial position coordinate of a preset part of the user according to the depth image; and determining the sound source direction of the user according to a spatial position coordinate of the microphone array and the spatial position coordinate of the preset part of the user.

Further, the apparatus further comprises:

a distance determining unit for determining a distance between the smart device and the user according to the depth image in the direction of the user;

a judging unit for determining to control the smart device to move when a distance between the smart device and a preset part of the user is greater than a preset distance threshold; and a movement controlling unit for controlling the smart device to move toward the direction of the user to shorten the distance between the smart device and the user when it is determined to control the smart device to move.

In an embodiment of the present disclosure, the distance determining unit is particularly for determining a spatial position coordinate of a preset part of the user according to the depth image in the direction of the user; and determining a distance between the smart device and the preset part of the user according to the spatial position coordinate of the microphone array and the spatial position coordinate of the preset part of the user.

Further, the judging unit is particularly for determining to control the smart device to move when a distance between the smart device and a preset part of the user is greater than a preset distance threshold.

The voice enhancement apparatus of a smart device in the present embodiment can be used to perform the embodiments of the method as described above. Since the principle and the technical effects thereof are similar, they will not be repeated here.

Figure 7:
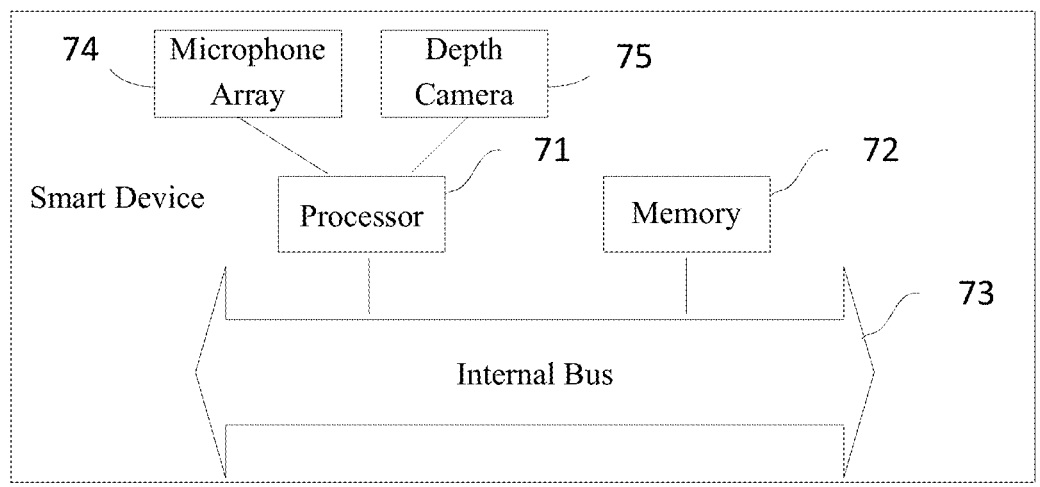
FIG. 7 is a principle block diagram of a smart device according to an embodiment of the present disclosure.

FIG. 7 is the principle block diagram of a smart device according to an embodiment of the present disclosure.

Referring to FIG. 7, the smart device comprises a processor 71 and a memory 72 which are communicatively connected by an internal bus 73. The smart device further comprises a microphone array 74 and a depth camera 75 that are connected to the processor 71 respectively. The microphone array 74 monitors and collects a voice signal sent by a user is in real time, and sends the voice signal to the processor 71. The depth camera 75 collects a depth image in the direction of the user, and sends the depth image to the processor 71. The memory 72 stores program instructions executable by the processor 71, and when executed by the processor 71, the program instructions can implement the voice enhancement method of a smart device as described above.

In addition, the logic instructions in the memory 72 may be implemented in the form of a software functional unit and sold or used as a separate product, and may be stored in a computer readable storage medium. Based on such an understanding, the technical solution of the present disclosure itself, or the part thereof which contributes to the prior art, or any part thereof may be embodied in the form of a software product, which is stored in a storage medium and includes instructions to cause a computing device (which may be a personal computer, a server, or a network device, etc.) to perform all or part of the steps of the methods described in various embodiments of the present disclosure. The storage medium may be any medium that can store program codes such as a U disk, a mobile hard disk, a read-only memory (ROM), a random access memory (RAM), a magnetic disk, or an optical disk, etc.

An embodiment of the present disclosure provides a computer readable storage medium, on which computer instructions are stored, and the computer instructions can cause the computer to implement the voice enhancement method of a smart device described in the foregoing embodiments.

In sum, according to the technical solutions of the present disclosure, firstly the direction of the user is roughly determined according to the obtained voice signal sent by the user of the smart device; and after obtaining the approximate direction of the user, a depth image in the direction of the user is further collected, and then the sound source direction of the user is accurately determined according to the depth image. The sound source direction of the user determined according to the depth image is used as a reference for adjusting the beamforming direction of the microphone array, and the quality and intensity of the sound in the sound source direction of the user is improved.

Compared with the prior art, the present disclosure determines the sound source direction of the user more accurately by using the depth image, and thus determines the beamforming direction of the microphone array more accurately. Therefore, the microphone array can accurately face the sound source direction of the user and perform voice enhancement, the defect of the prior art that voice commands cannot be recognized and obtained because the determined sound source direction of the user is inaccurate and the actual voice signal sent by the user may be misjudged and filtered out as noise in the voice enhancement processing can be overcome, the effect of voice enhancement can be improved, and the voice command can be recognized and obtained.

A person skilled in the art should understand that the embodiments of the present disclosure may be provided as a method, a system, or a computer program product. Thus, the present disclosure may take the form of an entire hardware embodiment, an entire software embodiment, or an embodiment combining software and hardware. Furthermore, the present disclosure may take the form of a computer program product embodied on one or more computer-usable storage media (including, but not limited to, disk storage, CD-ROMs, optical memories, etc.) having a computer-usable program code recorded thereon.

The present disclosure is described with reference to flowcharts and/or block diagrams of the method, the device (system), and the computer program product according to the embodiment of the present disclosure. It should be understood that each flow and/or block in the flowcharts and/or block diagrams, and combinations of the flows and/or blocks in the flowcharts and/or block diagrams may be implemented by computer program instructions. The computer program instructions may be provided to a processor of a general purpose computer, a special purpose computer, an embedded processor, or other programmable data processing device to generate a machine so that a device for implementing the functions specified in one or more flows of the flowcharts and/or one or more blocks of the block diagrams can be generated by instructions executed by a processor of a computer or other programmable data processing device.

It should be noted that the terms "comprise", "include" or any other variations thereof are intended to cover nonexclusive incorporations, so that a process, method, article, or device comprising a series of elements does not only comprise those elements listed, but also comprises other elements which are not listed, or the elements that are inherent to such a process, method, article, or device. In the case that there is no more limitation, an element defined by the wording "comprising a" does not exclude the additional same element in the process, method, article or device that comprises the element.

In the description of the present disclosure, many specific details are illustrated. However, it can be understood that the embodiments of the present disclosure may be implemented without those specific details. In some instances, well-known methods, structures and techniques are not shown in detail in order not to obscure the understanding of this description. Similarly, it should be understood that in order to simplify the disclosure of the present disclosure and help understand one or more of the various inventive aspects, in the above description of the exemplary embodiments of the present disclosure, various features of the present disclosure are sometimes grouped together in a single embodiment, figure, or description thereof. However, the disclosed method should not be interpreted as reflecting the intention that the claimed present disclosure requires more features than those expressly recited in each claim. More exactly, as the claims reflect, inventive aspects include features less than all the features of a single foregoing disclosed embodiment. Thus, the claims following the detailed description are hereby expressly incorporated into this detailed description, with each claim being an independent embodiment of the present disclosure.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

What is claimed is:

1. A voice enhancement method of a smart device, comprising:
   monitoring and collecting a voice signal sent by a user in real time;
   determining a direction of the user according to the voice signal, wherein the direction of the user is a current direction of the user;
   collecting a depth image in the direction of the user;
   determining a sound source direction of the user according to the depth image;
   adjusting a beamforming direction of a microphone array on the smart device according to the sound source direction of the user, and performing enhancement processing on the voice signal;
   monitoring a movement of the user in real time;
   collecting a moving direction of the user when the monitoring determines the user is moving;
   controlling the smart device to move toward the moving direction of the user, and collecting a depth image in the direction of the user after the user moves; and
   determining the sound source direction of the user according to the re-collected depth image in the direction of the user;
   wherein controlling the smart device to move comprises:
   controlling the smart device to move and to rotate;
   determining a horizontal rotation direction of the smart device according to an included angle between an X-axis and a projection line of a line connecting a center point of the microphone array and a head of the user in a horizontal plane, wherein a spatial position coordinate system is established with a depth camera as an origin, wherein a direction perpendicular to a ground and pointing upwardly is a positive direction of a Y-axis; the X-axis and a Z-axis are parallel to the ground; and the X-axis is perpendicular to the Z-axis.

2. The method according to claim 1, wherein using the microphone array to monitor and collect the voice signal sent by a user in real time;
   using a depth camera to collect the depth image in the direction of the user; and
   the step of determining a sound source direction of the user according to the depth image comprises: determining a spatial position coordinate of a preset part of the user according to the depth image; and determining the sound source direction of the user according to a spatial position coordinate of the microphone array and the spatial position coordinate of the preset part of the user.

3. The method according to claim 2, further comprising:
   determining a distance between the smart device and the user according to the depth image in the direction of the user;
   determining whether to control the smart device to move according to the distance between the smart device and the user; and
   if yes, controlling the smart device to move toward the direction of the user to shorten the distance between the smart device and the user.

4. The method according to claim 3, wherein
   the step of determining a distance between the smart device and the user according to the depth image in the direction of the user comprises: determining a spatial position coordinate of a preset part of the user according to the depth image in the direction of the user; and determining a distance between the smart device and the preset part of the user according to the spatial position coordinate of the microphone array and the spatial position coordinate of the preset part of the user; and
   the step of determining whether to control the smart device to move according to the distance between the smart device and the user comprises: if a distance between the smart device and a preset part of the user is greater than a preset distance threshold, controlling the smart device to move.

5. The method according to claim 2, wherein the preset part of the user is a head or neck of the user.

6. A voice enhancement apparatus of a smart device, comprising:
   a voice signal collecting unit for monitoring and collecting a voice signal sent by a user in real time;
   a user direction determining unit for determining a direction of the user according to the voice signal, wherein the direction of the user is a current direction of the user;
   a depth image collecting unit for collecting a depth image in the direction of the user;
   a sound source direction determining unit for determining a sound source direction of the user according to the depth image; and
   an enhancement processing unit for adjusting a beamforming direction of a microphone array on the smart device according to the sound source direction of the user, and performing enhancement processing on the voice signal; and
   a movement monitoring unit for monitoring a movement of the user in real time;
   a moving direction collecting unit for collecting a moving direction of the user when the monitoring unit determines the user is moving; and
   a movement controlling unit for controlling the smart device to move toward the moving direction of the user,
   wherein the depth image collecting unit is further configured for collecting a depth image in the direction of the user after the user moves,
   wherein the sound source direction determining unit is further configured for determining the sound source direction of the user according to the re-collected depth image in the direction of the user;
   wherein controlling the smart device to move comprises:
   controlling the smart device to move and to rotate;
   determining a horizontal rotation direction of the smart device according to an included angle between an X-axis and a projection line of a line connecting a center point of the microphone array and a head of the user in a horizontal plane, wherein a spatial position coordinate system is established with a depth camera as an origin, wherein the direction perpendicular to a ground and pointing upwardly is the positive direction of a Y-axis; the X-axis and a Z-axis are parallel to the ground; and the X-axis is perpendicular to the Z-axis.

7. The apparatus according to claim 6, wherein the sound source direction determining unit is particularly for:
   determining a spatial position coordinate of a preset part of the user according to the depth image; and
   determining the sound source direction of the user according to a spatial position coordinate of the microphone array and the spatial position coordinate of the preset part of the user.

8. The apparatus according to claim 7, further comprising:
a distance determining unit for determining a distance between the smart device and the user according to the depth image in the direction of the user;
a judging unit for determining to control the smart device to move when a distance between the smart device and a preset part of the user is greater than a preset distance threshold; and
a movement controlling unit for controlling the smart device to move toward the direction of the user to shorten the distance between the smart device and the user when it is determined to control the smart device to move.

9. A smart device, comprising a memory and a processor which are communicatively connected by an internal bus, wherein the smart device further comprises a voice collector and a depth camera that are connected to the processor respectively;
the voice collector monitors and collects in real time a voice signal sent by a user, and sends the voice signal to the processor;
the depth camera collects a depth image in the direction of the user, and sends the depth image to the processor;
the memory stores program instructions executable by the processor, and when executed by the processor, the program instructions implement the steps of:
determining a direction of the user according to the voice signal received, wherein the direction of the user is a current direction of the user;
receiving a depth image in the direction of the user, and determining a sound source direction of the user according to the depth image; and
adjusting a beamforming direction of a microphone array on the smart device according to the sound source direction of the user, and performing enhancement processing on the voice signal; and
wherein the depth camera is further configured for monitoring a movement of the user in real time, and sending the movement to the processor;
wherein, when executed by the processor, the program instructions further implement the steps of:
according to a received movement state of the user, collecting a moving direction of the user when the user is moving;
controlling the smart device to move toward the moving direction of the user, and collecting a depth image in the direction of the user after the user moves; and
determining the sound source direction of the user according to the re-collected depth image in the direction of the user;
wherein controlling the smart device to move comprises:
controlling the smart device to move and to rotate; and
determining a horizontal rotation direction of the smart device according to an included angle between an X-axis and a projection line of a line connecting a center point of the microphone array and a head of the user in a horizontal plane, wherein a spatial position coordinate system is established with the depth camera as an origin, wherein the direction perpendicular to a ground and pointing upwardly is the positive direction of a Y-axis; the X-axis and a Z-axis are parallel to the ground; and the X-axis is perpendicular to the Z-axis.

10. The smart device according to claim 9, wherein the step of determining a sound source direction of the user according to the depth image by the processor comprises:
determining a spatial position coordinate of a preset part of the user according to the depth image; and
determining the sound source direction of the user according to a spatial position coordinate of the microphone array and the spatial position coordinate of the preset part of the user.

11. The smart device according to claim 10, wherein when executed by the processor, the program instructions further implement the steps of:
determining a distance between the smart device and the user according to the depth image in the direction of the user;
determining whether to control the smart device to move according to the distance between the smart device and the user; and
if yes, controlling the smart device to move toward the direction of the user to shorten the distance between the smart device and the user.

12. The smart device according to claim 11, wherein
the step of determining a distance between the smart device and the user according to the depth image in the direction of the user by the processor comprises: determining a spatial position coordinate of a preset part of the user according to the depth image in the direction of the user; and determining a distance between the smart device and the preset part of the user according to the spatial position coordinate of the microphone array and the spatial position coordinate of the preset part of the user; and
the step of determining whether to control the smart device to move according to the distance between the smart device and the user by the processor comprises: if a distance between the smart device and a preset part of the user is greater than a preset distance threshold, controlling the smart device to move.

13. The smart device according to claim 9, wherein the voice collector is a microphone array.

* * * * *